United States Patent [19]

Dauvergne

[11] 4,253,305

[45] Mar. 3, 1981

[54] ASSISTED BRAKING DEVICE

[75] Inventor: Jean Louis R. Dauvergne, Survilliers, France

[73] Assignee: Societe Anonyme Francaise du Ferodo, Paris, France

[21] Appl. No.: 919,943

[22] Filed: Jun. 28, 1978

[30] Foreign Application Priority Data

Jul. 7, 1977 [FR] France .............................. 77 20884

[51] Int. Cl.³ .............................................. B60T 13/20
[52] U.S. Cl. ........................................ 60/550; 60/551; 60/594; 91/391 A
[58] Field of Search ............. 60/550, 551, 594, 547 R; 91/391 R, 391 A

[56] References Cited

U.S. PATENT DOCUMENTS

| 1,997,062 | 4/1935 | Huffman | 60/551 |
| 2,229,247 | 1/1941 | Kamenarović | 60/551 |
| 2,323,406 | 7/1943 | Milhaupt | 60/551 |
| 2,846,031 | 8/1958 | Kelley | 60/550 |
| 2,976,849 | 3/1961 | Stelzer . | |
| 3,707,075 | 12/1972 | Cripe | 91/391 A |
| 3,808,817 | 5/1974 | Bennett | 60/550 |
| 4,024,795 | 5/1977 | Sawyer | 91/391 R |

FOREIGN PATENT DOCUMENTS

| 2449612 | 4/1976 | Fed. Rep. of Germany | 60/551 |
| 2549194 | 5/1976 | Fed. Rep. of Germany . | |
| 545670 | 6/1942 | United Kingdom . | |

Primary Examiner—Abraham Hershkovitz
Attorney, Agent, or Firm—Young & Thompson

[57] ABSTRACT

The invention provides an assisted braking device which operates in conjunction with a brake pedal disposed at one end of a brake lever. The device comprises a master piston and cylinder assembly the piston of which is interconnected with the piston of an assisting jack by means of a connecting element on which is articulated the brake lever. The end of the brake lever remote from the brake pedal acts on a distributor adapted to feed the assisting jack with assisting hydraulic pressure so that when a force is applied to the brake pedal and thereby to the master piston via the connecting element, the distributor directs hydraulic fluid under pressure to the assisting jack, the piston of which then applies an assisting force to the connecting element.

6 Claims, 4 Drawing Figures

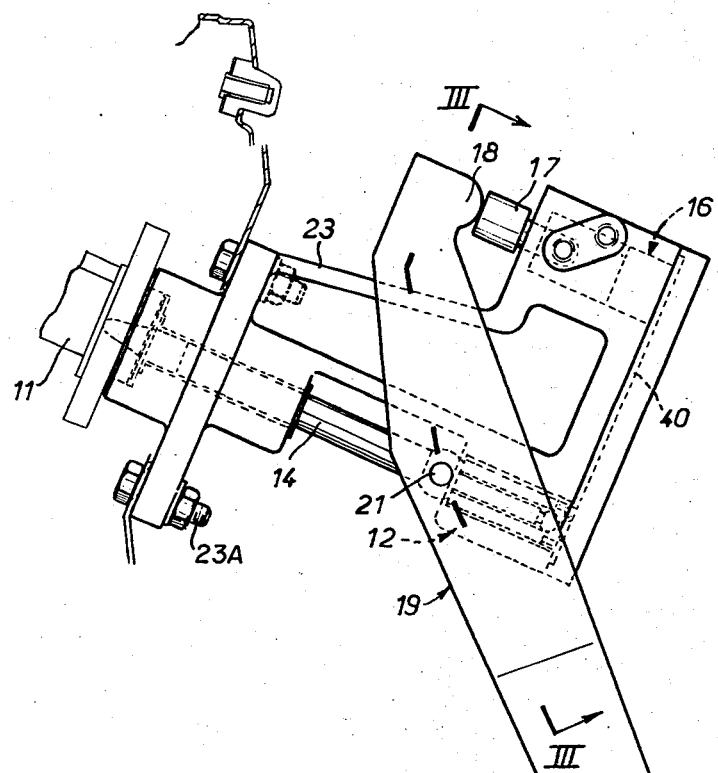
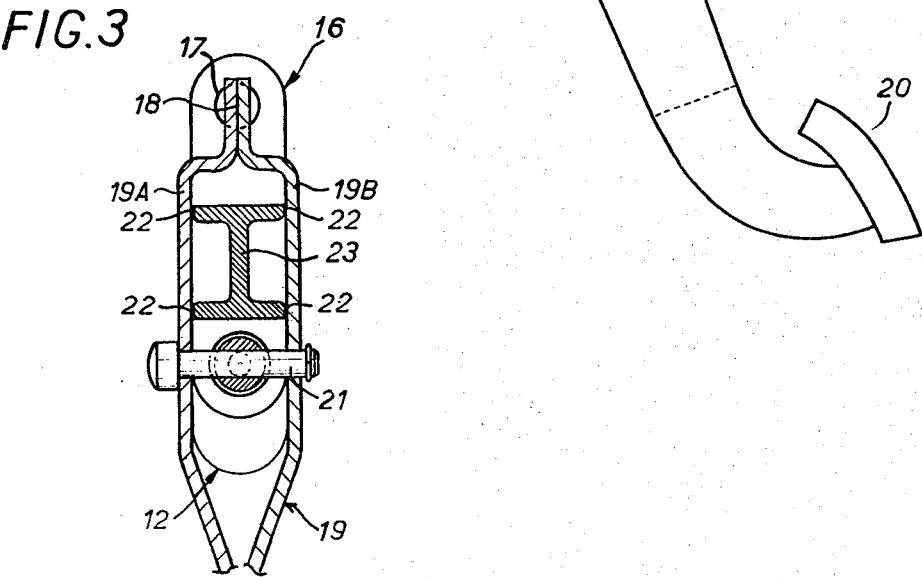

ASSISTED BRAKING DEVICE

BACKGROUND OF THE INVENTION

The present invention relates to an assisted braking device comprising a master piston mounted for sliding in a master cylinder, a jack having a piston connected to the master piston by interconnection means, a source of assisting hydraulic pressure, and a distributor adapted to supply assisting hydraulic pressure to the jack from the said source and operated in response to the actuation of pilot means comprising a pedal.

Devices of this kind are generally situated inside an engine compartment and make use of a complex linkage which introduces play and friction.

The object of the present invention is the provision of an assisted braking device of the type indicated above whose construction is extremely simple.

SUMMARY

According to the present invention an assisted braking device of the kind described above is characterised in that the pedal is disposed at one end of a lever which is mounted directly by an articulation on the said interconnection means, while its other end acts on the aforesaid distributor.

Through this arrangement the pedal is given a direct floating mounting for actuating the master piston, while the assistance device has a compact construction of small dimensions.

It is advantageous for the pedal lever to be provided with means maintaining it in a substantially vertical plane which preferably passes through the interconnection means.

More particularly, these maintaining means comprise dividing the pedal lever into two plane parts which are spaced apart and guided for sliding on each side of two bearing surfaces defined by a fixed body fastened to the master cylinder and receiving the distributor and the jack.

In the event of the failure of the assistance, this can be made good manually by the action of the foot on the pedal through the striking of the distributor slide valve against its stop.

The means of interconnection between the jack piston and the master piston are preferably connected to the jack piston by a connection which operates in one direction only so that, if the assisting hydraulic pressure is not available, manual operation of the pedal will directly actuate the master piston without thereby driving the jack piston. This makes it possible to prevent the latter from offering unnecessary and obstructive resistance in the course of this manual operation.

BRIEF DESCRIPTION OF THE DRAWINGS

FIG. 2 is a view of this device on a larger scale in side elevation;

FIG. 3 is a view of the device in section on the broken line III—III in FIG. 2.;

DESCRIPTION OF THE PREFERRED EMBODIMENT

Figure 1:
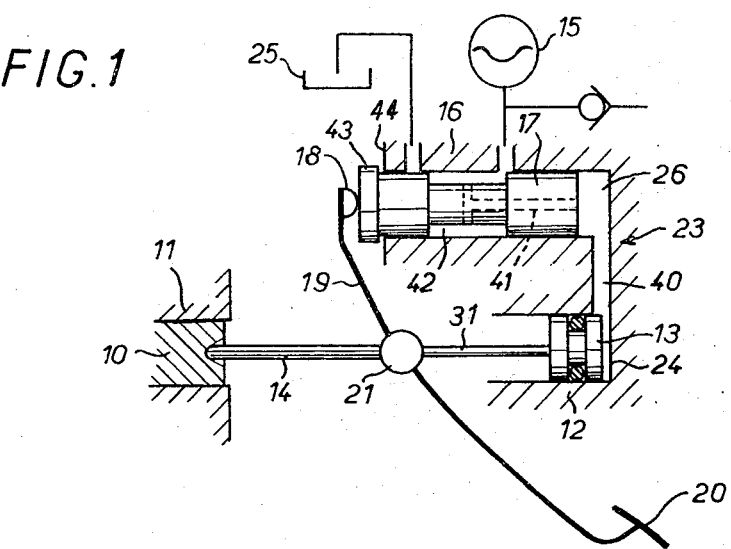
FIG. 1 is a general diagrammatical view of an assisted braking device according to the invention.

In the embodiment illustrated in FIGS. 1 to 4, which relates by way of example without limitation to the application of the invention to the braking of an automobile vehicle, an assisted braking device comprises a master piston 10 mounted for sliding in a master cylinder 11. A jack 12 is axially in line with the master cylinder 11 and comprises a piston 13 which is connected to the master piston 10 by axially aligned interconnection means. The latter consists of a rod 14 in the example illustrated.

The jack 12 has a hydraulic chamber 24 which is partially defined by the piston 13 and the application of pressure to which enables the piston 13 to be displaced. The chamber 24 is connected by a duct 40 to a chamber 26 of a distributor 16, whose slide valve can be seen at 17. The chamber 26 is partially defined by the end face of the slide valve 17 and by way of a duct 41 provided in the slide valve 17 in communication with an intermediate annular groove 42 provided in the said slide valve 17.

The slide valve 17 is subjected to two opposing forces, one of which is developed by the end 18 of a lever 19 and which urges it to the right in FIG. 1, while the other is developed by the hydraulic pressure in the chamber 26 and urges it towards the left in FIG. 1. The movement of the slide valve 17 towards the right is limited mechanically by a collar 43 which is provided on the slide valve 17 and which bears against a bearing surface 44 on the distributor body 16. Depending on the position of the slide valve 17, the annular groove 42 can be brought into communication either with a tank 25 or with a source 15 of assisting hydraulic pressure, for example a pressure accumulator associated with a pump.

The lever 19, whose end 18 acts on the slide valve 17 of the distributor 16, constitutes a pilot means and at its opposite end is provided with a brake pedal 20 for the driver of the vehicle.

Between the ends 18 and 20 the pedal lever 19 is articulated on the interconnection means 14 about a horizontal axis 21.

The pedal lever 19 is thus mounted floatingly by direct mounting on the rod 14, but is held in a vertical plane passing through the said rod. For this purpose the lever 19 (FIG. 3) is divided into two plane parts 19A and 19B spaced apart from one another and guided for sliding on parallel plane bearing surfaces 22 of a body 23. This body 23 is common to the distributor 16 and to the jack 20 and is fastened by bolts 23A to the master cylinder 11.

As long as the pedal 20 is not depressed, the end 18 of the lever 19 will not apply a thrust to the slide valve 17. The pressure source 15 is isolated from the chamber 24 of the jack 12, this chamber being in communication with the tank 25.

Figure 4:
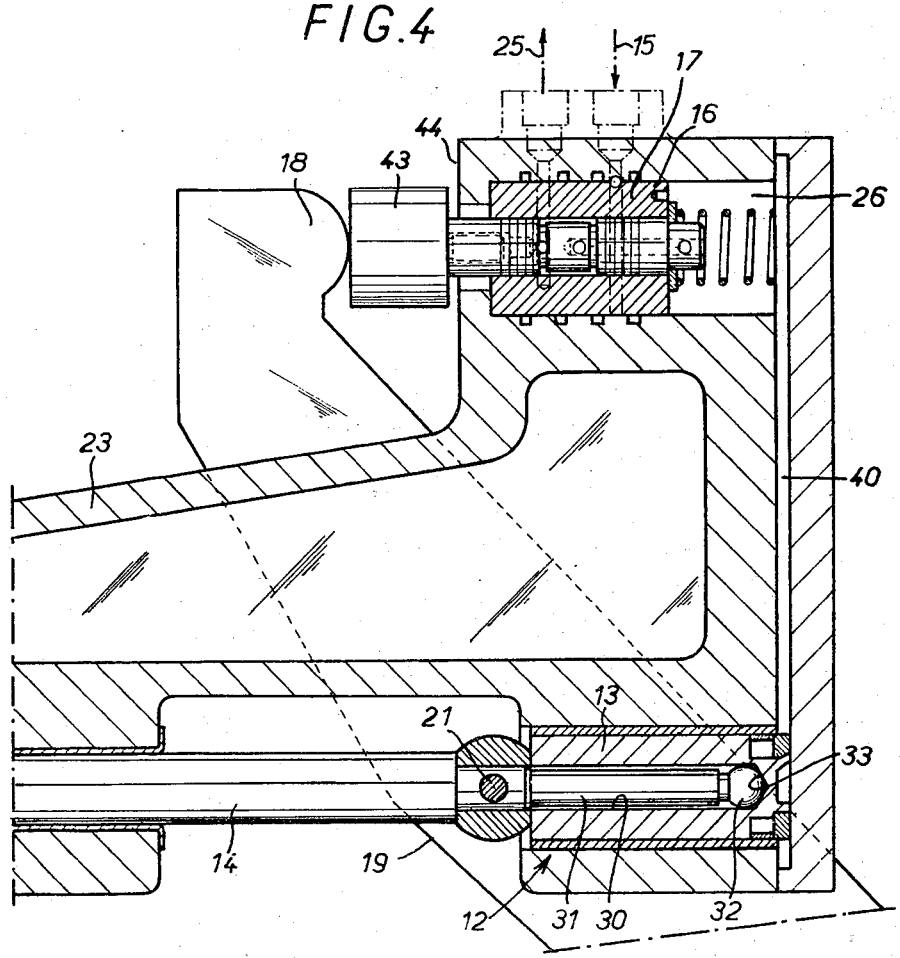
FIG. 4 is a detail view on a larger scale, showing the distributor and the jack.

When the pedal 20 is depressed for braking purposes, the slide valve 17 is pushed towards the right in FIGS. 1, 2 and 4. The chamber 24 is isolated from the tank 25. The pressure source 15 is brought into communication in a modulated manner with this chamber 24, so that the piston 13 is pushed towards the left in FIGS. 1, 2, and 4, and at the same time the rod 14 and master piston 10 are pushed in the same direction.

Braking is thus effected with assistance and under accurate control by the action of the driver on the pedal 20 and will be perceptible to the driver through the resistance felt by his foot as the result of the pressure in the chamber 26.

In the event of the failure of the assisting hydraulic pressure, action on the pedal 20 will have the effect of turning the lever 19 about the articulation 21 and of bringing the slide valve 17 of the distributor into the position of abutment at 43-44 through the action of the end 18. Action on the pedal 20 then has the effect of pushing the rod 14 and the master piston 10 directly towards the left in FIG. 1, thus effecting braking.

The rod 14 is preferably connected to the piston 13 by a one-way connection, in order to prevent the rod 14, when driven direct by the pedal 20, from carrying the piston 13 with it.

More particularly, the piston 13 is provided with an axial bore 30 in which an end 31 of the rod 14 is simply engaged. At its extremity the end 31 has a spherical head 32 which cooperates in a one-way action with the bottom 33 of the bore 30.

The extremely simple construction of the braking distributor according to the invention will be appreciated, since the pedal 20 is mounted direct on the rod 14 interconnecting the jack piston 13 and the master piston 10, with a mounting which is floating but guided in a vertical plane.

It should be noted that the lever 19 could be guided on simple bosses on the body 23. It need not be divided into two. Means such as a key or pin can be provided for guiding the pedal. It is advantageous for the jack 12 and the master cylinder 11 to be in alignment, but they need not be. The accumulator 15 could be replaced by a positive displacement pump.

I claim:

1. In an assisted braking device comprising a master piston mounted for sliding in a master cylinder, a jack having a piston connected to the master piston by interconnection means, a source of assisting hydraulic pressure, and a distributor adapted to feed the jack with assisting hydraulic pressure from the said source and operated in response to the actuation of pilot means comprising a pedal disposed at one end of a lever whose other end acts on the said distributor, and wherein the other end of the said lever acts directly on the said distributor; the improvement in which the lever is mounted directly by an articulation on said interconnection means, said interconnection means being continuously rigid between said jack piston and said master piston so as to form supporting means for said lever, and said other end of said lever acting on said distributor in one direction only and pushing against said distributor and lateral fixed guide surfaces slidingly cooperating with the pedal lever for maintaining it in a substantially vertical plane, said guide surfaces being located between the supporting articulation of the pedal lever on the interconnection means and said other end of the pedal lever pushing against said distributor.

2. An assisted braking device according to claim 1, wherein the supporting articulation of the pedal lever on the interconnected means is located between the master piston and said jack.

3. An assisted braking device according to claim 1, further comprising stop means adapted to cooperate with said pedal lever in the event of the failure of the assistance so as to allow for manual operation.

4. An assisted braking device according to claim 1, wherein said interconnection means comprises a rod that extends from said jack piston to said master piston and said articulation is on the rod between the ends of the rod.

5. In an assisted braking device comprising a master piston mounted for sliding in a master cylinder, a jack having a piston connected to the master piston by interconnection means, a source of assisting hydraulic pressure, and a distributor adapted to feed the jack with assisting hydraulic pressure from the said source and operated in response to the actuation of pilot means comprising a pedal disposed at one end of a lever whose other end acts on the said distributor, and wherein the other end of the said lever acts directly on the said distributor; the improvement in which the lever is mounted directly by an articulation on said interconnection means, said interconnection means being continuously rigid between said jack piston and said master piston so as to form supporting means for said lever, and said other end of said lever acting on said distributor in one direction only and pushing against said distributor and lateral fixed guide surfaces slidingly cooperating with the pedal lever for maintaining it in a substantially vertical plane, said distributor and said jack being mounted in a fixed body fastened to the master cylinder and said guide surfaces are formed by ribs on said fixed body.

6. An assisted braking device according to claim 5, wherein the lever pedal comprises two spaced portions flanking said fixed body.

* * * * *